United States Patent [19]
Bergano

[11] Patent Number: 6,137,604
[45] Date of Patent: Oct. 24, 2000

[54] CHROMATIC DISPERSION COMPENSATION IN WAVELENGTH DIVISION MULTIPLEXED OPTICAL TRANSMISSION SYSTEMS

[75] Inventor: Neal S. Bergano, Lincroft, N.J.

[73] Assignee: Tyco Submarine Systems, Ltd., Eatontown, N.J.

[21] Appl. No.: 08/759,493

[22] Filed: Dec. 4, 1996

[51] Int. Cl.[7] .................................................. H04J 14/02
[52] U.S. Cl. ........................ 359/124; 359/130; 359/134; 359/161; 359/173; 359/179; 359/188; 385/122; 385/24
[58] Field of Search ..................... 359/124, 130, 359/134, 161, 173, 179, 188; 385/122, 24

[56] References Cited

PUBLICATIONS

"Four–Photon Mixing and High–Speed WDM Systems", R. W. Tkach et al., Journal of Lightwave Technology, vol. 13, No. 5, May 1995, pp. 841–849.
21st European Conference on Optical Communications, Brussels, Belgium, paper Th.A.3.1, Sep. 1995.

*Primary Examiner*—Kinfe-Michael Negash

[57] ABSTRACT

A method and apparatus is provided for managing dispersion in a WDM optical transmission system so that transmission performance is improved. The usable optical bandwidth of the transmission system is divided into sub-bands that individually undergo dispersion compensation before being re-combined. Accordingly, in comparison to known dispersion mapping techniques, more WDM data channels reside near a wavelength corresponding to the average zero dispersion wavelength.

66 Claims, 9 Drawing Sheets

CHROMATIC DISPERSION COMPENSATION IN WAVELENGTH DIVISION MULTIPLEXED OPTICAL TRANSMISSION SYSTEMS

FIELD OF THE INVENTION

The invention relates to the optical transmission of information and, more particularly, to a method and apparatus for compensating for chromatic dispersion that accrues over optical fiber transmission systems.

BACKGROUND OF THE INVENTION

The availability of high performance optical amplifiers such as the Erbium-Doped Fiber-Amplifier (EDFA) has renewed interest in the use of wavelength division multiplexing (WDM) for optical transmission systems. In a WDM transmission system, two or more optical data carrying channels are combined onto a common path for transmission to a remote receiver. Typically, in a long-haul optical fiber system, the set of wavelength channels would be amplified simultaneously in an optical amplifier based repeater. The Erbium-Doped Fiber-Amplifier is particularly useful for this purpose because of its ability to amplify multiple wavelength channels without crosstalk penalty.

Typically, it is advantageous to operate long-haul transmission systems at high data rates per channel. For example, useful data rates include multiples of the Synchronous Digital Hierarchy (SDH) standard, i.e., 2.5 and 10 Gb/s. As the bit rates increase through the gigabit per second range, the optical powers launched into the transmission fiber need to approach 1 mW per channel. As was demonstrated by Bergano et al. (European Conference on Optical Communications, Brussels, Belgium, paper Th.A.3.1, Sept. 1995) the Non-Return-to-Zero (NRZ) transmission format is particularly useful for transmitting large amounts of data over optically amplified fiber paths. However, NRZ channels operating over long distances require sufficient control over the total amount of chromatic dispersion to ensure low dispersion penalties. Accordingly, the preferred transmission medium for such a system is dispersion shifted optical fibers.

Crosstalk, or the mixing of channels through the slight nonlinearity in the transmission fiber, may arise from the combination of long distance, low dispersion and high channel power. The transmission of many WDM channels over transoceanic distances may be limited by nonlinear interactions between channels, which in turn is affected by the amount of dispersion. This subject was reviewed by Tkach et al. (Journal of Lightwave Technology in Vol. 13, No. 5, May 1995 pp. 841–849). As discussed in Tkach et al., this problem may be overcome by a technique known as dispersion mapping, in which the generation of mixing products is reduced by offsetting the zero dispersion wavelength of the transmission fiber from the operating wavelengths of the transmitter. This technique employs a series of amplifier sections having dispersion shifted fiber spans with either positive or negative dispersion. The dispersion accumulates over multiple fiber spans of approximately 500 to 1000 km. The fiber spans of either positive or negative sign are followed by a dispersion-compensating fiber having dispersion of the opposite sign. This subsequent section of fiber is sufficient to reduce the average dispersion (averaged over the total length of the transmission system) substantially to zero. That is, a fiber of high negative (positive) dispersion permits compensation by a length of positive (negative) transmission fiber.

The efficacy of the dispersion mapping technique is limited because the amount of dispersion that occurs in a typical optical fiber depends on the operating wavelength that is employed. That is, only one given wavelength can operate at average zero dispersion. The wavelength dependence of the dispersion coefficient is sometimes referred to as the dispersion slope of the fiber. Accordingly, because of this characteristic of the dispersion slope, the various channels employed in a WDM system cannot all operate at the wavelength of average zero dispersion. This limitation can be overcome to a limited degree by using individual channel dispersion compensation at the receiver. However, since these systems are subject to nonlinear penalty, the ability to correct for the non-zero dispersion at the receiver terminal is limited.

SUMMARY OF THE INVENTION

In accordance with the present invention, a method and apparatus is provided for managing dispersion in a WDM optical transmission system so that transmission performance is improved. In accordance with the inventive method, the usable optical bandwidth of the transmission system is divided into sub-bands that individually undergo dispersion compensation before being re-combined. Accordingly, in comparison to known dispersion mapping techniques, more WDM data channels reside near a wavelength corresponding to the average zero dispersion wavelength.

In one embodiment of the invention, a WDM optical communication system is provided that includes a transmitter, receiver, an optical fiber transmission path coupling the transmitter to the receiver, and at least one optical amplifier. A dispersion compensator, which is disposed at an intermediate point along the transmission path, includes an optical splitter for dividing a signal introduced therein onto a plurality of optical paths. The signal has a prescribed bandwidth. A bandpass filter is disposed along each of the optical paths and divides the prescribed bandwidth of the signal into a plurality of distinct sub-bands. A dispersion compensating element is coupled to each of the bandpass filters. The dispersion compensating optical elements each substantially compensate for dispersion at a prescribed wavelength within the bandpass of its respective bandpass filter. A coupler is employed to recombine the distinct sub-bands and couple the recombined distinct sub-bands onto the optical fiber transmission path.

DETAILED DESCRIPTION

Figure 1:
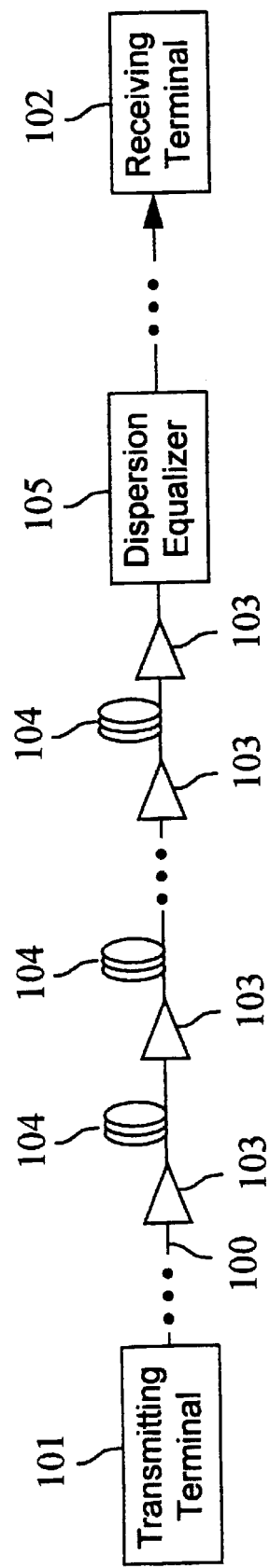
FIG. 1 shows a simplified block diagram of an optical fiber transmission system in accordance with the present invention.

FIG. 1 shows a simplified block diagram of an exemplary optical fiber transmission system in accordance with the present invention. The system includes an optical transmission path 100, a transmitting terminal 101, and a receiving terminal 102. The transmitting terminal 101 provides an optical data signal that is to be transmitted to the remote receiving terminal via the optical fiber transmission path 100. The optical signal presented by the terminal 101 to the transmission path 100 may comprise a plurality of WDM optical carriers each carrying an SDH signal. FIG. 1 shows a single period of the dispersion map consisting of optical amplifiers 103, spans of transmission fiber 104, and dispersion compensator 105. In a typical long-haul system, this series of components constituting the dispersion map period might be repeated a number of times over the length of the system. The optical amplifiers 103 may be EDFAs, for example, which amplify optical signals in the 1550 nm wavelength band. In one embodiment of the invention the transmission fibers 104 may be dispersion-shifted single-mode fibers with an average zero dispersion wavelength higher than the operating wavelengths of the system. For example, the transmission fibers 104 may be similar to those used in Bergano et al. (European Conference on Optical Communications, Brussels, Belgium, paper Th.A.3.1, Sept. 1995), in which the transmission fiber had an average zero dispersion wavelength of 1580 nm and a dispersion slope of about 0.073 ps/km-nm$^2$.

A simple linearized chromatic dispersion relationship between the signal wavelength $\lambda_{sig}$ and the dispersion D is given in equation 1:

$$D = SL(\lambda_{sig} - \lambda_0) \quad (1)$$

where the dispersion D is measured in units of ps/nm, the dispersion slope S is measured in units of ps/km-nm$^2$, and the average zero dispersion wavelength $\lambda_0$ of the transmission fiber is measured in units of nm. As equation 1 clearly indicates, the point of minimum dispersion only occurs at one particular wavelength $\lambda_0$. Accordingly, as disclosed in U.S. Pat. No. 5,559,920, if a set of WDM channels were transmitted along the transmission path 100, a dispersion compensating fiber could only translate one channel back to the zero dispersion wavelength. The remaining channels would accumulate dispersion. As previously noted, this problem can be alleviated with individual channel dispersion compensation at the receiver; however, since these systems are subject to nonlinear penalty, the ability to correct for the non-zero dispersion at the receiver terminal is limited. Thus, to transmit the channels with low dispersion penalty, there is an upper bound on the maximum amount of accumulated dispersion that each channel can tolerate, which is bit rate dependent. As the bit rate of each channel is increased, the allowable amount of accumulated dispersion per channel is reduced. This problem is overcome by the dispersion compensator shown in FIG. 2.

Figure 2:
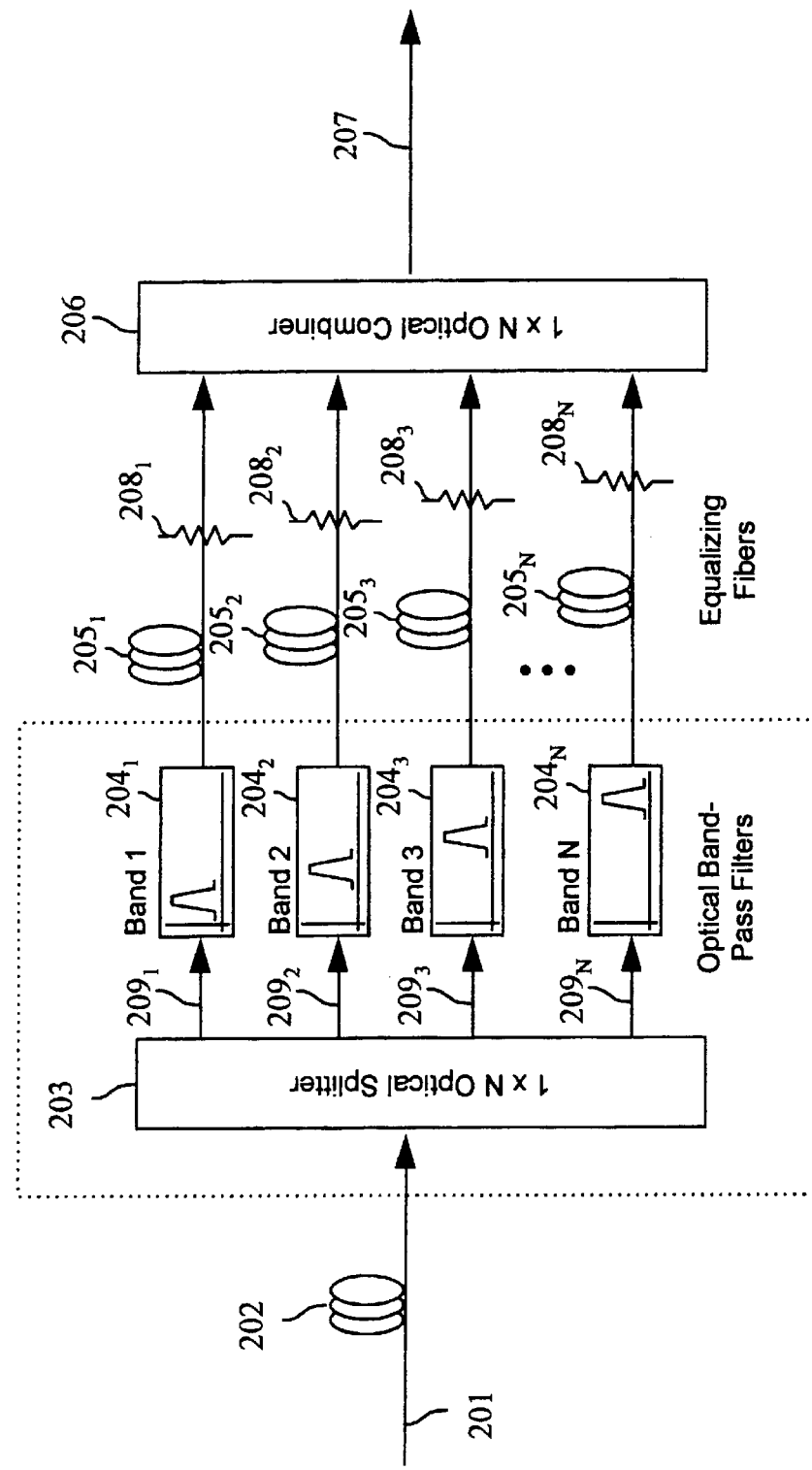
FIG. 2 shows a simplified block diagram of one embodiment of the dispersion compensator shown in FIG. 1.

FIG. 2 shows one embodiment of the chromatic dispersion compensator 105 constructed in accordance with the present invention. In operation, the dispersion compensator first splits the bandwidth of the optical signals traversing the optical amplifiers 103 into a series of bands, equalizes the dispersion of each band individually, and finally recombines the signals onto a common path for continued transmission. In FIG. 2, the signals reach the compensator on fiber path 201 and enter an optional first dispersion compensating fiber 202. The signals next enter a 1×N optical splitter 203, which divides the power of the optical signal onto output paths $209_1, 209_2, 209_3, \ldots 209_N$. The signals propagating along the N output paths respectively enter optical band-pass filters $204_1, 204_2, 204_3, \ldots 204_N$ with a center wavelength of $\lambda_1, \lambda_2, \lambda_3, \ldots \lambda_N$, respectively. The optical bandpass filters 204 separate the usable bandwidth into N distinct bands. In a preferred embodiment of the invention the wavelengths transmitted by the bandpass filters 204 do not overlap one other and have sufficient extinction in their stop-bands so that when the bands are recombined in coupler 206, any interference effects will be sufficiently small to avoid adversely impacting the system's performance. The signals emerging from bandpass filters $204_1, 204_2, 204_3, \ldots 204_N$ each enter a respective dispersion equalizing fiber $205_1, 205_2, 205_3, \ldots 205^N$ and possibly loss elements $208_1, 208_2, 208_3, \ldots 208_N$. The signals are subsequently recombined in coupler 206 before exiting the dispersion compensator on fiber 207. The dispersion in each of the plurality of compensating fibers $205_1, 205_2, 205_3, \ldots 205_N$ is selected so that the average chromatic dispersion of the concatenated transmission spans 104 upstream from the dispersion compensator 105 and the equalizing sections 202 and 205 are substantially returned to zero at each of the center wavelengths $\lambda_N$.

Compensating fiber 202 is optionally provided as a potential cost saving step to perform any dispersion compensation that is required by all of the N wavebands. For example, if the required amount of dispersion compensation ranged from −1000 ps/nm for band 1 to −500 ps/nm for band N, equalizing fiber 202 advantageously may provide −500 ps/nm of dispersion, which is required by each of the N wavebands. Accordingly, the amount of equalizing dispersion needed in the plurality of fibers $205_1, 205_2, 205_3, \ldots 205_N$ would range from −500 ps/nm to 0 ps/nm. The equalizing fiber 202 may be directly incorporated into the transmission path itself, thus yielding a significant cost savings. For example, the equalizing fiber 202 may be an extension of the cable defining the transmission path.

When provided, the loss elements $208_1, 208_2, 208_3, \ldots 208_N$ facilitate the equalization of the gain for the respective N wavebands. For example, an EDFA-based transmission system may require some degree of gain equalization when employed in wide-band applications. The loss elements $208_1, 208_2, 208_3, \ldots 208_N$ may be selected to equalize the received signal-to-noise ratio of the transmitted WDM channels in the N wavebands.

In the embodiment of the invention shown in FIG. 2 the equalizing elements 202 and 205 are signal-mode fibers. Of course, those of ordinary skill in the art will recognize that many other optical devices may be employed to provide the necessary dispersion compensation. For example, fiber diffraction gratings may be used instead of single-mode fibers. One advantage accruing from the use of a fiber diffraction grating is that the slope of the dispersion characteristic as well as the dispersion itself may be appropriately adjusted. If compensating elements 205 comprise single-mode fibers having equal dispersions per unit length, the resulting propagation delay for the different bands would be different. If this posed any system problems, the propagation delays could be equalized by constructing equalizing fibers having differing dispersions per unit length. In this manner the required dispersion compensation is provided while equalizing the propagation length for all the bands.

Figure 3:
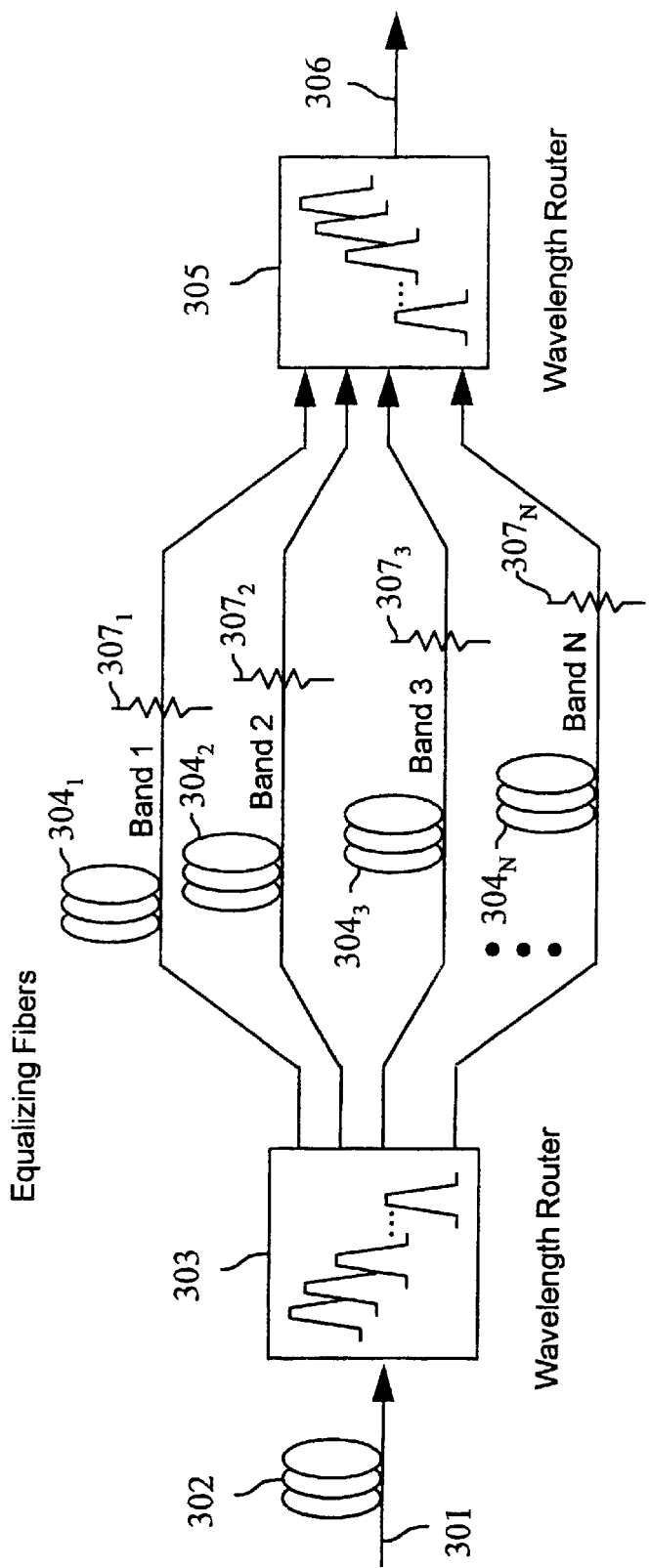
FIG. 3 shows a simplified block diagram of another embodiment of the invention employing wavelength routing devices

FIG. 3 shows an alternative embodiment of the invention in which the functions performed by the optical splitter 203 and bandpass filters 204 in the FIG. 2 embodiment are performed by a wavelength routing device 303 such as disclosed in U.S. Pat. Nos. 5,002,350 and 5,412,744 to Dragone, for example. Similarly, the optical coupler 206 also may be replaced with a wavelength routing device 305. In FIG. 3, signals are directed to optional first dispersion compensating fiber 302 on fiber 301 before entering wavelength routing device 303. The wavelength routing device 303 divides the incoming signals into N output bands, which are each directed to a respective dispersion equalizing fiber $304_1$, $304_2$, $304_3$, . . . $304_N$. The dispersion compensated signals enter respective loss element $307_1$, $307_2$, $307_3$, . . . $307_N$ (if employed) before being recombined in wavelength routing device 305 and emerging on fiber 306.

Figure 4:
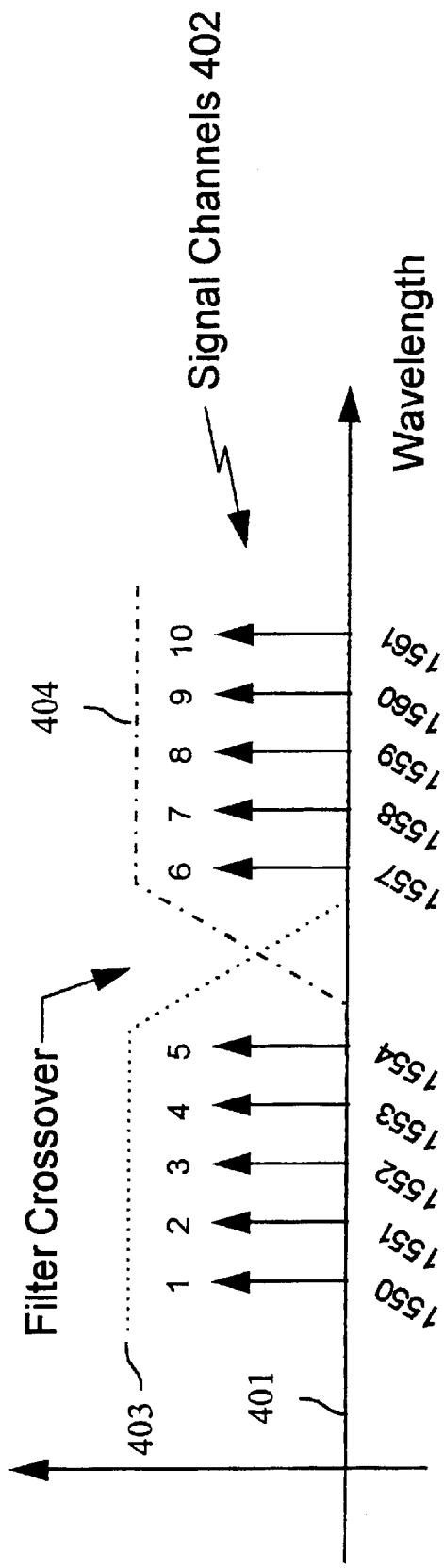
FIG. 4 shows the wavelength allocations for a dispersion compensator that divides the signal into two wavebands.

FIG. 4 shows the allocation of wavelengths for an embodiment of the invention in which a signal comprising ten WDM channels is divided into two wavebands. FIG. 4 shows the lower and upper wavebands 403 and 404 into which the signal is divided. This example assumes that the transmission fibers 104 have a nominal zero dispersion wavelength of 1580 nm and a dispersion slope of 0.073 ps/km-nm$^2$. The dispersion compensators are assumed to be spaced at 500 km intervals along the transmission path of the transmission system. The lower and upper wavebands are centered at 1552 nm and 1559 nm, respectively. Within each waveband the channel spacing is 1 nm and the wavelength spacing between the bands (i.e. between channels 5 and 6) is 3 nm.

Figure 5:
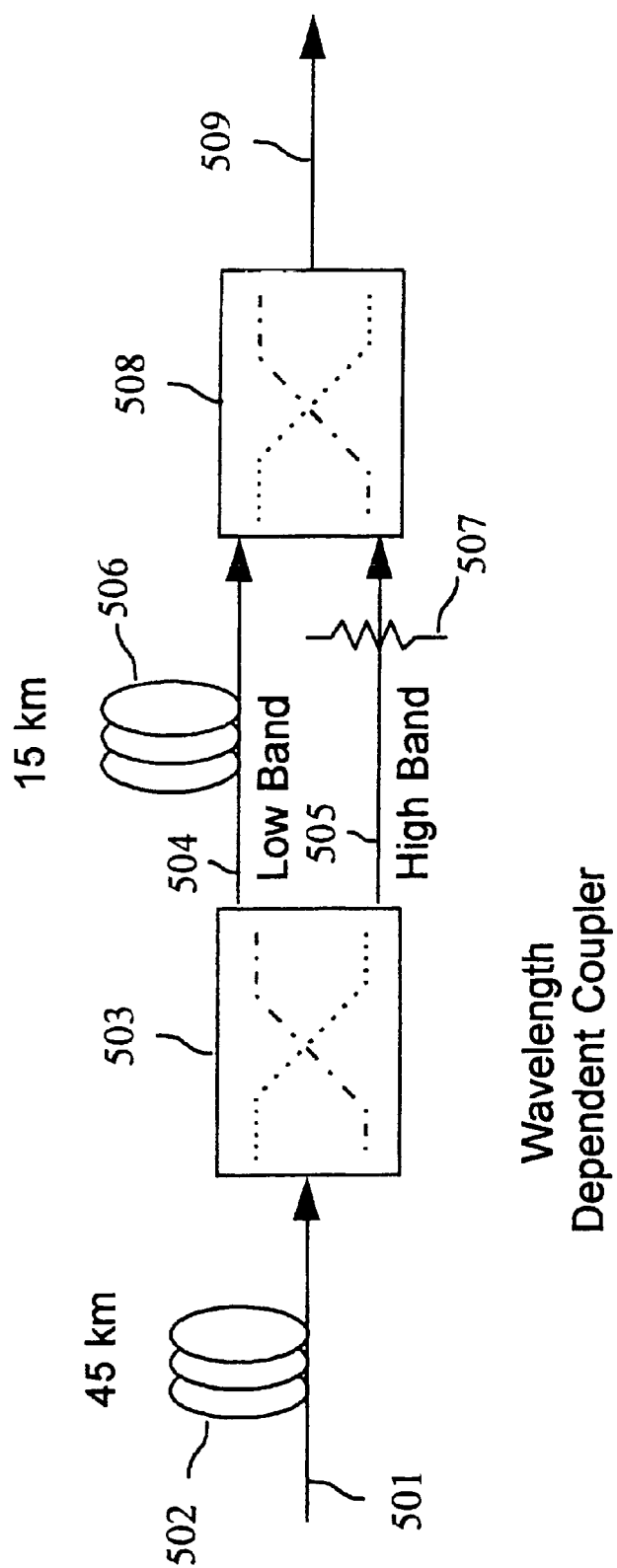
FIG. 5 shows a block diagram of the dispersion compensator employed in FIG. 4.

FIG. 5 shows the structure of the two band dispersion compensator that is used in connection with FIG. 4. Signals enter a common compensating fiber 502, which is 45 km in length, on optical fiber 501. The average chromatic dispersion of fiber 502 is about 17 ps/km-nm, which is typical of a conventional step-index single-mode fiber with a center wavelength $\lambda_0$ of 1310 nm. Accordingly, the total dispersion in this fiber is about 765 ps/nm (or 45 km×17 ps/km-nm). The signals are then directed to wavelength routing device 503 and the two wavebands are separated onto fibers 504 and 505. The low band channels 1–5 are directed to equalizing fiber 506, which is 15 km long with a dispersion of 255 ps/nm (15 km×17 ps/km-nm). The high band channels 6–10 are directed on path 505 to attenuator 507, which has approximately the same attenuation as fiber 506, which would be about 3 dB for a typical fiber. However, it is anticipated that attenuator 507 could alternatively have a different value that would aid in equalizing the average gains for the low and high bands, considering the non-equal gains in the EDFA repeaters. The high and low bands are then recombined in wavelength dependent coupler 508 onto a common path 509. It is anticipated that the extinction ratio of wavelength dependent couplers 503 and 508 will be made sufficiently large such that signals traveling through unwanted paths would be at a low enough level to minimize the impact of any interference effects on the system's end-to-end performance.

Figure 6:
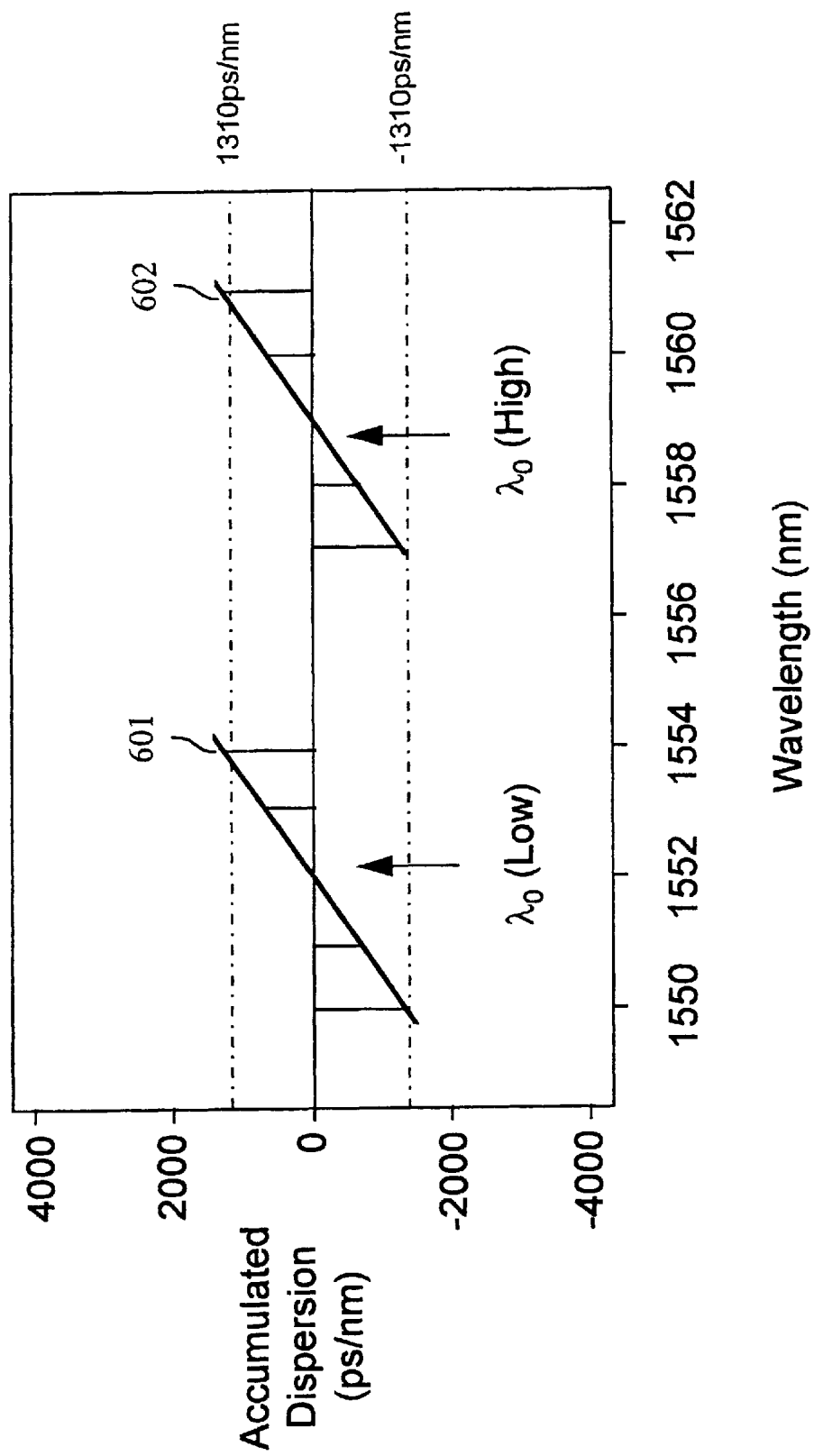
FIG. 6 shows the accumulated dispersion versus wavelength for a system utilizing the dispersion compensator shown in FIG. 4.

FIG. 6 shows the accumulated chromatic dispersion versus wavelength over a 9000 km system that employs the dispersion compensator shown in FIG. 5. The maximum accumulated dispersion for all 10 channels is 1310 ps/nm, as indicated by the vertical lines crossing dispersion characteristic 601 for the low band and dispersion characteristic 602 for the high band. Therefore, the two band dispersion compensator reduces by over 50% (relative to known dispersion compensators) the maximum amount of dispersion experienced by the outermost WDM channels.

Figure 7:
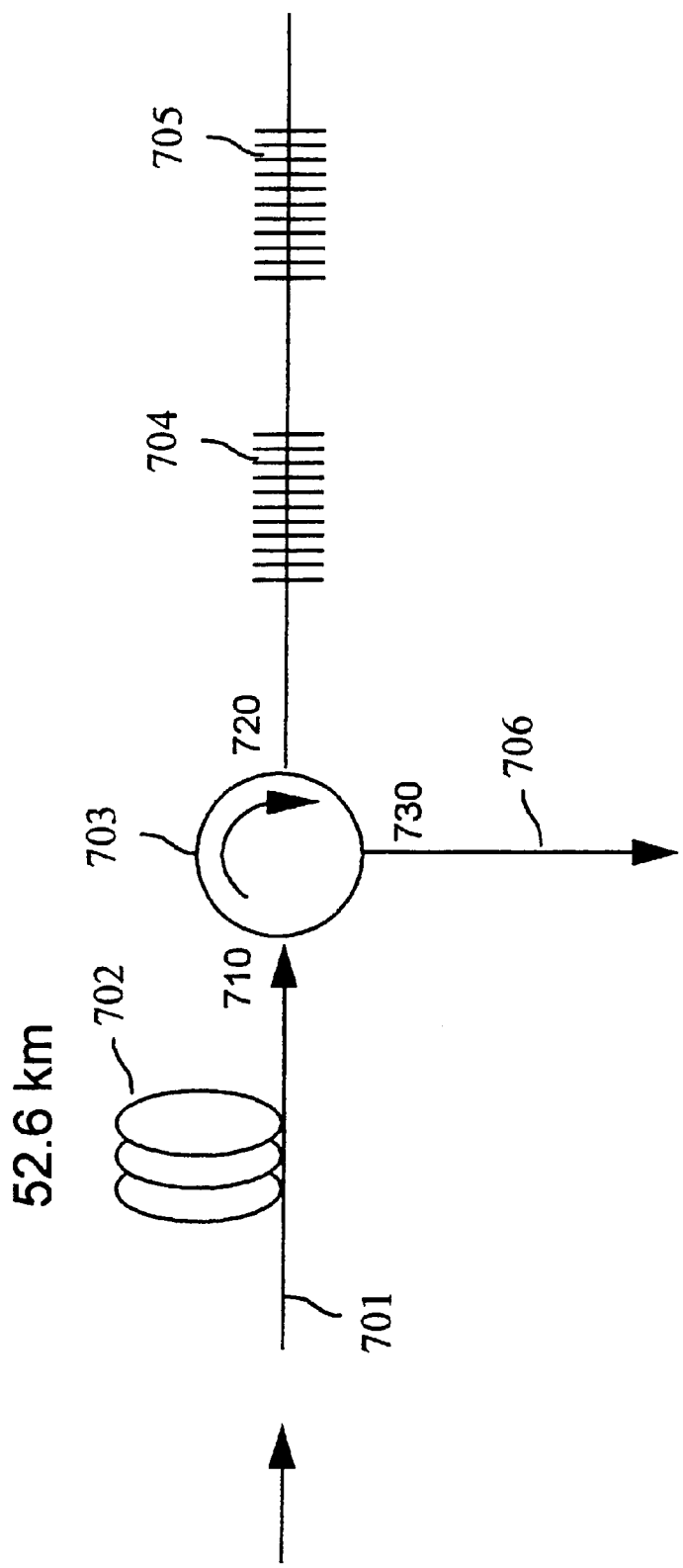
FIG. 7 shows an alternative embodiment of the dispersion compensator which employs chirped fiber gratings.

FIG. 7 shows another alternative embodiment of the two band dispersion compensator shown in FIG. 5. In this case chirped fiber gratings are provided, which perform both band selection, and at least part of the requisite dispersion compensation. In FIG. 7, the signal, which comprises a plurality of WDM channels, is directed to a common compensating fiber 702 on fiber 701. In one particular embodiment of the invention compensating fiber 702 is about 52.6 km in length. Fiber 702 has an average chromatic dispersion of about 17 ps/km-nn, which is typical of conventional step-index single-mode fiber with a center wavelength $\lambda_0$ of 1310 nm. Accordingly, the total dispersion in this fiber is about 894 ps/nm (or 52.6 km×17 ps/km-nm). Fiber 702 shifts the mean zero dispersion wavelength from its value of 1580 nm arising in the fiber preceding fiber 701 to a wavelength of 1555.5 nm. This wavelength denotes the cross-over point indicated in FIG. 4, which separates the lower from the upper waveband. The WDM channels enter input port 710 of a three port circulator 703, which, for example, may be similar to the device provided by JDS Fitel Inc. (570 West Hunt Club Road, Nepean, Ontario, Canada K2G 5W8) under model number CR2500. The WDM channels exit the circulator 703 on output port 720 of circulator 703 and enter the first chirped fiber grating filter 704. Fiber grating filters 704 and 705 are linearly chirped gratings that reflect signals over different wavelength bands. Fibers of this type have been described by Cole et al. in "Continuously chirped, broadband dispersion-compensating fiber gratings in a 10 Gb/s 110 km standard fiber link," presented at the 22$^{nd}$ European Conference on Optical Communication, paper ThB.3.5. The reflection from fiber grating 704 provides a constant amplitude response for channels 1–5 (as denoted in FIG. 4) and a constant dispersion of +128 ps/nm. The reflection from fiber grating 705 provides a constant amplitude response for channels 6–10 (as denoted in FIG. 4) and a constant dispersion of –128 ps/nm. Since fiber grating filter 704 is reflective only for channels 1–5, channels 6–10 will be transmitted therethrough with minimal attenuation. The reflected channels 1–10 enter circulator 703 on port 720 and exit port 730 onto fiber 706. The dispersion characteristic that results over a system length of 9,000 km is the same as shown in FIG. 6. The common compensating fiber 702 is used to reduce the stringency of the design requirements for fiber gratings 704 and 705. However, the dispersion characteristics of these gratings alternatively may include the dispersion compensation imparted by fiber 702. For example, a comparable amount of dispersion compensation can be achieved by removing fiber 702 and specifying the dispersion in fiber gratings 704 and 705 to be $^+$1022 ps/nm and $^+$767 ps/nm, respectively. Of course, one of ordinary skill will recognize that the embodiment of the invention shown in FIG. 7 can be extended to accommodate a multiplicity of wavebands by adding additional fiber gratings.

Figure 8:
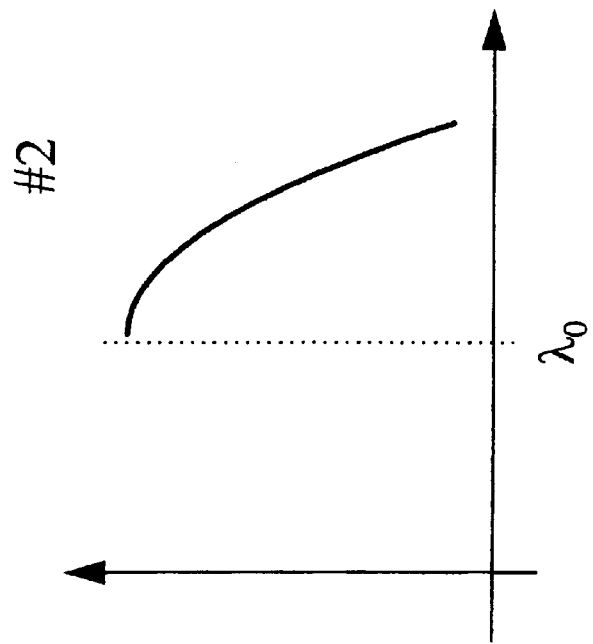
FIG. 8 shows the propagation delay of the signal reflected off of the two fiber grating filters shown in FIG. 7.
Figure 8:
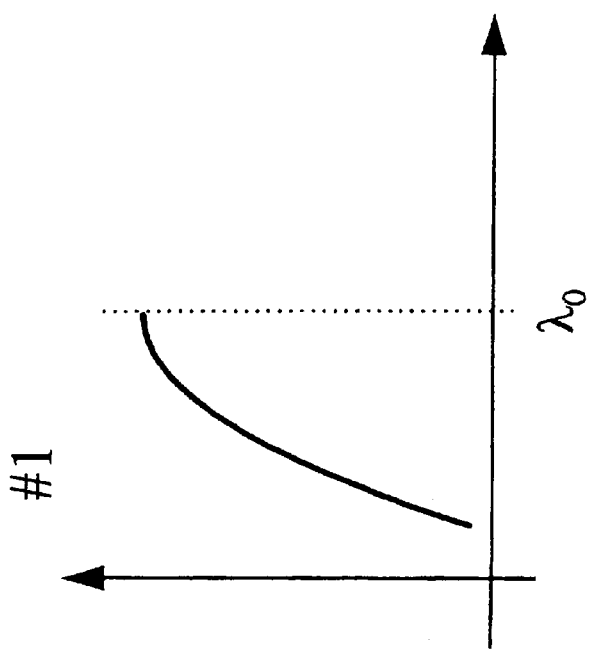

The embodiments of the invention described prior to FIG. 7 do not include any provision for correcting the dispersion slope. However, the embodiment shown in FIG. 7 can correct for both the dispersion and the slope of the dispersion. That is, the total accumulated dispersion for all channels can be reduced essentially to zero. This is achieved by quadratically chirping rather than linearly chirping the fiber gratings 704 and 705 so that the delay in the dispersion compensator is approximately equal in magnitude but opposite in sign to the delay in the fiber span, as shown in FIG. 8. FIG. 8 shows the relative propagation delay of the reflected signal from two fiber grating filters designed to flatten the dispersion over a wide waveband when used in a dispersion compensator similar to that shown in FIG. 7. In FIG. 8 the delay characteristic is parabolic to correct for the fiber's chromatic dispersion over a substantial part of the required waveband.

In the previously described embodiments of the invention it was assumed that the transmission fiber had a negative dispersion and that the dispersion compensator had a positive dispersion. Of course, those skilled in the art will recognize that the invention alternatively could operate in connection with a transmission fiber having a positive dispersion and a dispersion compensator that has negative dispersion. Moreover, the invention is not limited to signals arranged in an NRZ transmission format. For example, the invention is also applicable to soliton transmission systems, particularly those systems that use sliding frequency-guiding jitter control. In such systems the optical powers should be directly tied to the average chromatic dispersion. The dispersion slope causes the different soliton WDM channels to operate at different optical powers. Accordingly, the present invention may advantageously equalize the optical powers by allowing the channels to operate at similar values of chromatic dispersion. Other soliton systems in which the invention may be advantageously employed include a dispersion managed soliton system in which accumulated jitter is minimized by periodically reducing dispersion with a dispersion equalizer.

Figure 9:
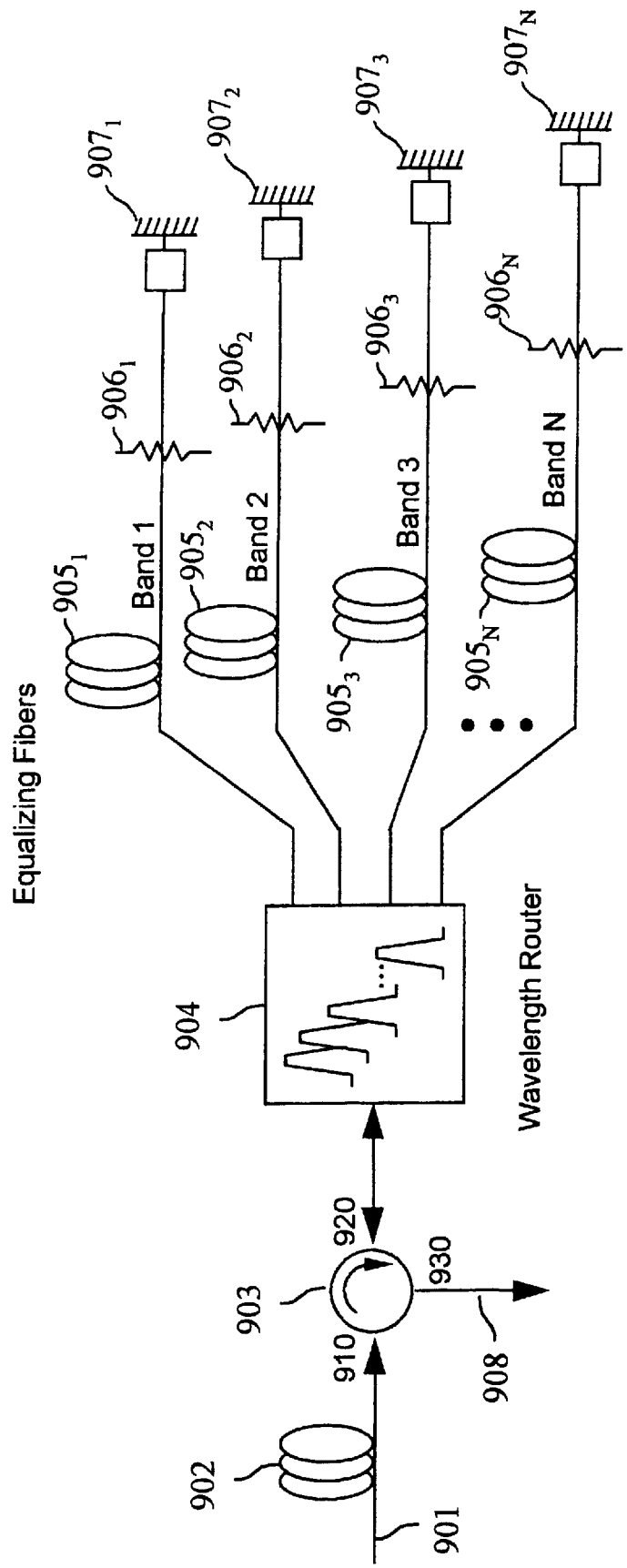
FIG. 9 shows an alternative embodiment of the invention that employs Faraday rotator mirror reflectors.

FIG. 9 shows an alternative embodiment of the dispersion compensator shown in FIG. 3, in which the functions of splitting and recombining the signal are performed by a wavelength routing device. In this embodiment, Faraday rotator mirror reflectors are employed so that the optical signals traverses the wavelength routing device, dispersion compensating elements, and the attenuators on two occasions. This arrangement may be advantageous because it requires only a single routing device and because the deleterious effects of polarization dependence in the optical components can be reduced.

In operation, the optical signal is received by the compensator on input fiber 901 and enters the common compensating fiber 902, if provided. The signal next enters port 910 of a three port circulator 903, exits on port 920 of circulator 903, and is received by wavelength routing device 904. The wavelength routing device 904 divides the signal into a plurality of output bands which are directed along distinct optical paths to a respective one of the dispersion compensating fibers $905_1$, $905_2$, $905_3$, . . . $905_N$ and loss elements $906_1$, $906_2$, $906_3$, . . . $906_N$. Because the output bands traverse the dispersion compensating fibers $905_1$, $905_2$, $905_3$, . . . $905_N$ and loss elements $906_1$, $906_2$, $906_3$, . . . $906_N$ on two occasions, the amount of dispersion compensation and loss which must be imparted by fibers $905_1$, $905_2$, $905_3$, . . . $905_N$ and loss elements $906_1$, $906_2$, $906_3$, . . . $906_N$, respectively, can be half of that imparted by the corresponding components in the embodiment of FIG. 3. The optical bands each enter a Faraday rotator mirror 907, which reflects the bands back on themselves with a state-of-polarization that is orthogonal to its respective input state. The Faraday rotator mirror may be, for example, of the type supplied by E-TEK Dynamics, Inc. (1885 Lundy Ave., San Jose, Calif. 95131) as model HSFM.

One of ordinary skill in the art will recognize that when an optical element such as the wavelength routing device is placed between a circulator and a Faraday rotator mirror, the polarization dependence of the optical element is effectively removed (or at least substantially reduced when observed from the input and output of the circulator). Accordingly, the embodiment of the invention shown in FIG. 9 advantageously allows the use of a wavelength router having less stringent polarization dependent loss specifications.

The optical bands reflected by mirrors 907 once again traverse loss elements $906_1$, $906_2$, $906_3$, . . . $906_N$ and dispersion compensating elements $905_1$, $905_2$, $905_3$, . . . $905_N$ and are recombined onto a single fiber in the routing device 904. The recombined signal enters port 920 of circulator 903 and is returned to the transmission path of the system on fiber 908 by port 930 of circulator 903.

It should be appreciated by those skilled in the art that the common compensating fiber 902 may be alternatively located between port 920 of circulator 903 and the wavelength routing device 904. In this case the signal would traverse the compensating fiber twice, thus only requiring it to impart half the dispersion that would be required by the configuration shown in FIG. 9.

What is claimed is:

1. A WDM optical communication system, comprising:
   a transmitter and a receiver;
   an optical fiber transmission path coupling said transmitter to said receiver, said transmission path including at least one optical amplifier;
   a dispersion compensator disposed at an intermediate point along said transmission path, said compensator including:
   an optical splitter for dividing a signal introduced therein onto a plurality of optical paths, said signal having a prescribed bandwidth;
   a bandpass filter disposed along each of said optical paths, said filters dividing the prescribed bandwidth of the signal into a plurality of distinct sub-bands;
   a dispersion compensating element coupled to each of the bandpass filters, said dispersion compensating optical elements each substantially compensating for dispersion at a prescribed wavelength within the bandpass of its respective bandpass filter;
   a coupler for recombining said distinct sub-bands and coupling said recombined distinct sub-bands onto said optical fiber transmission path.

2. The communication system of claim 1 wherein said plurality of sub-bands are substantially non-overlapping in wavelength.

3. The system of claim 1 wherein said dispersion compensating elements are single-mode optical fibers.

4. The system of claim 1 wherein said dispersion compensating elements are fiber diffraction gratings.

5. The system of claim 4 wherein said fiber diffraction gratings are chirped gratings.

6. The system of claim 5 wherein said gratings are linearly chirped.

7. The system of claim 5 wherein said gratings are quadratically chirped.

8. The system of claim 1 wherein said signal is a soliton signal.

9. The system of claim 1 further comprising an additional dispersion compensating element preceding said optical splitter for providing a common amount of dispersion to all of the sub-bands.

10. The system of claim 9 wherein said additional dispersion compensating element is an extension of the fiber transmission path.

11. The system of claim 1 further comprising a plurality of loss elements disposed in said optical paths to provide gain equalization to the sub-bands.

12. The system of claim 1 wherein said prescribed wavelengths are substantially equal to center wavelengths of the respective bandpass filters.

13. The system of claim 12 wherein said prescribed wavelengths are offset from the respective center wavelengths by a predetermined amount.

14. The system of claim 4 wherein said plurality of optical paths are defined by reflections from different fiber gratings.

15. A dispersion compensator for use in a WDM optical communication system that includes a transmitter, receiver, and an optical fiber transmission path coupling said transmitter to said receiver, said transmission path including at least one optical amplifier, said dispersion compensator comprising:
   an optical splitter for dividing a signal introduced therein onto a plurality of optical paths, said signal having a prescribed bandwidth, said optical splitter being adapted to receive said signal from an intermediate point along said optical fiber transmission path;
   a bandpass filter disposed along each of said optical paths, said filters dividing the prescribed bandwidth of the signal into a plurality of distinct sub-bands;
   a dispersion compensating optical element coupled to each of the bandpass filters, said dispersion compensating optical elements each substantially compensating for dispersion at a prescribed wavelength within the bandpass of its respective bandpass filter;
   a coupler for recombining said distinct sub-bands, said coupler being adapted to couple said recombined distinct sub-bands onto said optical fiber transmission path.

16. The dispersion compensator of claim 15 wherein said plurality of sub-bands are substantially non-overlapping in wavelength.

17. The dispersion compensator of claim 15 wherein said dispersion compensating elements are single-mode optical fibers.

18. The dispersion compensator of claim 15 wherein said dispersion compensating elements are fiber diffraction gratings.

19. The dispersion compensator of claim 18 wherein said fiber diffraction gratings are chirped gratings.

20. The dispersion compensator of claim 19 wherein said gratings are linearly chirped.

21. The dispersion compensator of claim 19 wherein said gratings are quadratically chirped.

22. The dispersion compensator of claim 15 wherein said signal is a soliton signal.

23. The dispersion compensator of claim 15 further comprising an additional dispersion compensating element preceding said optical splitter for providing a common amount of dispersion to all of the sub-bands.

24. The system of claim 23 wherein said additional dispersion compensating element is an extension of the fiber transmission path.

25. The dispersion compensator of claim 15 further comprising a plurality of loss elements disposed in said optical paths to provide gain equalization to the sub-bands.

26. The dispersion compensator of claim 15 wherein said prescribed wavelengths are substantially equal to center wavelengths of the respective bandpass filters.

27. The dispersion compensator of claim 26 wherein said prescribed wavelengths are offset from the respective center wavelengths by a predetermined amount.

28. The dispersion compensator of claim 18 wherein said plurality of optical paths are defined by reflections from different fiber gratings.

29. A method for compensating for dispersion in a WDM optical communication system that includes a transmitter, receiver, and an optical fiber transmission path coupling said transmitter to said receiver, said method comprising the steps of:
   splitting a signal at an intermediate point along the transmission path to be directed onto a plurality of optical paths, said signal having a prescribed bandwidth;
   filtering the signals along each of said optical paths to divide the prescribed bandwidth of the signal into a plurality of distinct sub-bands;
   compensating for dispersion at a prescribed wavelength within the distinct sub-bands;
   recombining said distinct sub-bands and directing said recombined distinct sub-bands onto said optical fiber transmission path.

30. The method of claim 29 wherein said plurality of sub-bands are substantially non-overlapping in wavelength.

31. The method of claim 29 wherein the step dispersion compensation is accomplished with single-mode optical fibers.

32. The method of claim 29 wherein the step of dispersion compensation is accomplished with fiber diffraction gratings.

33. The method of claim 32 wherein said fiber diffraction gratings are chirped gratings.

34. The method of claim 33 wherein said gratings are linearly chirped.

35. The method of claim 33 wherein said gratings are quadratically chirped.

36. The method of claim 29 wherein said signal is a soliton signal.

37. The method of claim 29 further comprising the step of compensating for a select amount of dispersion prior to the step of filtering the signals.

38. The method of claim 37 wherein said select amount of dispersion compensation is provided along a portion of said fiber transmission path.

39. The method of claim 29 further comprising the step of introducing loss along the optical paths to provide gain equalization to the sub-bands.

40. The method of claim 29 wherein said prescribed wavelengths are substantially equal to center wavelengths of respective bandpass filters employed to perform the step of filtering the signals.

41. The method of claim 29 wherein said prescribed wavelengths are offset from the respective center wavelengths by a predetermined amount.

42. The method of claim 32 wherein said plurality of optical paths are defined by reflections from different fiber gratings.

43. A WDM optical communication system, comprising:
   a transmitter and a receiver;
   an optical fiber transmission path coupling said transmitter to said receiver, said transmission path including at least one optical amplifier;
   a dispersion compensator disposed at an intermediate point along said transmission path, said compensator including:
      a wavelength routing device for dividing a signal having a prescribed bandwidth into a plurality of distinct sub-bands;
      a plurality of output paths for respectively receiving said plurality of distinct sub-bands;
      a dispersion compensating optical element coupled to each of the output paths, said dispersion compensating optical elements each substantially compensating for dispersion at a prescribed wavelength within the bandpass of its respective sub-band;
      a coupler for recombining said distinct sub-bands and coupling said recombined distinct sub-bands onto said optical fiber transmission path.

44. The communication system of claim 43 wherein said plurality of sub-bands are substantially non-overlapping in wavelength.

45. The system of claim 43 wherein said dispersion compensating elements are single-mode optical fibers.

46. The system of claim 43 wherein said dispersion compensating elements are fiber diffraction gratings.

47. The system of claim 46 wherein said fiber diffraction gratings are chirped gratings.

48. The system of claim 47 wherein said gratings are linearly chirped.

49. The system of claim 47 wherein said gratings are quadratically chirped.

50. The system of claim 43 wherein said signal is a soliton signal.

51. The system of claim 43 further comprising an additional dispersion compensating element preceding said wavelength routing device for providing a common amount of dispersion to all of the sub-bands.

52. The system of claim 51 wherein said additional dispersion compensating element is an extension of the fiber transmission path.

53. The system of claim 43 further comprising a plurality of loss elements disposed in said optical paths to provide gain equalization to the sub-bands.

54. The system of claim 43 wherein said prescribed wavelengths are substantially equal to center wavelengths of the respective bandpass filters.

55. The system of claim 54 wherein said prescribed wavelengths are offset from the respective center wavelengths by a predetermined amount.

56. The system of claim 46 wherein said plurality of optical paths are defined by reflections from different fiber gratings.

57. The system of claim 43 wherein said coupler comprises a second wavelength routing device.

58. A WDM optical communication system, comprising:
   a transmitter and a receiver;
   an optical fiber transmission path coupling said transmitter to said receiver, said transmission path including at least one optical amplifier;
   a dispersion compensator disposed at an intermediate point along said transmission path, said compensator including:
   a circulator having at least an input port for receiving optical signals from the transmission path, an output port for transmitting optical signals onto the transmission path, and a third port;
   a wavelength routing device coupled to said third port of the circulator for dividing a signal having a prescribed bandwidth into a plurality of distinct sub-bands;
   a plurality of output paths for respectively receiving said plurality of distinct sub-bands;
   a dispersion compensating optical element coupled to each of the output paths, said dispersion compensating optical elements each substantially compensating for dispersion at a prescribed wavelength within the bandpass of its respective sub-band;
   a Faraday rotator mirror coupled to each of the dispersion compensating optical elements.

59. The communication system of claim 58 wherein said plurality of sub-bands are substantially non-overlapping in wavelength.

60. The system of claim 58 wherein said dispersion compensating elements are single-mode optical fibers.

61. The system of claim 58 wherein said signal is a soliton signal.

62. The system of claim 58 further comprising an additional dispersion compensating element preceding said wavelength routing device for providing a common amount of dispersion to all of the sub-bands.

63. The system of claim 62 wherein said additional dispersion compensating element is an extension of the fiber transmission path.

64. The system of claim 58 further comprising a plurality of loss elements disposed in said optical paths to provide gain equalization to the sub-bands.

65. The system of claim 58 wherein said prescribed wavelengths are substantially equal to center wavelengths of the respective bandpass filters.

66. The system of claim 65 wherein said prescribed wavelengths are offset from the respective center wavelengths by a predetermined amount.

* * * * *

UNITED STATES PATENT AND TRADEMARK OFFICE
CERTIFICATE OF CORRECTION

PATENT NO. : 6,137,604
DATED : October 24, 2000
INVENTOR(S) : Neal S. Bergano.

It is certified that error appears in the above-identified patent and that said Letters Patent is hereby corrected as shown below:

In Column 2, Line 55, please add a -- . -- after the word devices
In Column 4, Line 4, reference numeral "209ⁿ" should be --$209_n$--
In Column 4, Line 17, reference numeral "205ⁿ" should be --$205_n$--

Signed and Sealed this

Twenty-second Day of May, 2001

Attest:

NICHOLAS P. GODICI

Attesting Officer    Acting Director of the United States Patent and Trademark Office